US 8,483,681 B2

(12) United States Patent
Hun et al.

(10) Patent No.: US 8,483,681 B2
(45) Date of Patent: Jul. 9, 2013

(54) CHANNEL SCANNING METHOD OF WIRELESS COMMUNICATIONS SYSTEM

(75) Inventors: Ying-Zhe Hun, Taipei (TW);
Kuo-Chuan Wu, Tai-Chung (TW);
San-Ho Wei, Yun-Lin Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 493 days.

(21) Appl. No.: 11/556,699

(22) Filed: Nov. 5, 2006

(65) Prior Publication Data
US 2007/0105552 A1 May 10, 2007

(30) Foreign Application Priority Data

Nov. 7, 2005 (TW) .............................. 94138975 A (51) Int. Cl.
*H04W 4/00* (2009.01)
(52) U.S. Cl.
USPC ......................................... 455/434; 455/515
(58) Field of Classification Search
USPC .......... 455/434, 450, 452, 515, 77, 74, 150.1,
455/513, 343.2, 435.3, 452.2, 512, 343.3,
455/509, 455, 464, 435.1, 435.2; 370/347,
370/311
See application file for complete search history.

(56) References Cited

U.S. PATENT DOCUMENTS

| 5,457,711 A * | 10/1995 | Kellermann | 375/347 |
| 2004/0090929 A1 * | 5/2004 | Laux et al. | 370/311 |
| 2004/0209634 A1 * | 10/2004 | Hrastar | 455/515 |
| 2005/0107088 A1 * | 5/2005 | Oura | 455/450 |
| 2005/0169294 A1 * | 8/2005 | Tseng et al. | 370/437 |
| 2005/0288015 A1 * | 12/2005 | Azizi et al. | 455/434 |
| 2006/0215627 A1 * | 9/2006 | Waxman | 370/347 |
| 2007/0078974 A1 * | 4/2007 | Krishnan | 709/224 |

OTHER PUBLICATIONS

ANSI/IEEE 802.11 Specification; 10.3.2 Scan (p. 101-103) & Annex C: Service Synchronization_Sta (p. 379-386).

* cited by examiner

*Primary Examiner* — Charles Appiah
*Assistant Examiner* — Alexander Yi
(74) *Attorney, Agent, or Firm* — McClure, Qualey & Rodack, LLP (57) ABSTRACT

A channel scanning method applied to a wireless communication system for scanning a plurality of channels to select target channels capable of establishing corresponding connections is disclosed. The channel scanning method includes scanning a plurality of channels for determining if any of the channels is capable of establishing a corresponding connection; setting the channels capable of establishing corresponding connections to be a plurality of target channels; and scanning the target channels for determining if the target channels are capable of establishing corresponding connections, respectively.

15 Claims, 7 Drawing Sheets

CHANNEL SCANNING METHOD OF WIRELESS COMMUNICATIONS SYSTEM

BACKGROUND OF THE INVENTION

1. Field of the Invention

The present invention relates to wireless communications, and more specifically, to channel scanning in wireless communications systems.

2. Description of the Prior Art

Wireless communications technologies are now highly developed. As a result, the popularity of wireless LAN usage is increasing. There are three most commonly seen wireless LAN specifications, IEEE 802.11a, IEEE 802.11b, and IEEE 802.11g. It is typical that wireless network cards available in the market are able to support at least one of the above-mentioned three specifications. When a laptop computer is connected to a wireless LAN, the wireless network card installed in the laptop must first scan for access points (AP) available for establishing connections in the area where the laptop is presently located. In general, the operating system of the laptop periodically sends out channel scanning requests to the wireless network card. Upon receiving the channel scanning request, the wireless network card scans all channels to determine whether there are channels and access points that are available for establishing connections with the wireless network card. The wireless network card then reports the scanning result to the operating system. Therefore, if one or more access points are available, the user or the operating system can further decide to which of the available access points the laptop should connect.

As the number of available wireless LAN specifications continues to increase, new wireless network cards are inevitably required to support more wireless LAN specifications. However, the various wireless LAN specifications may utilize different radio frequency bands, and as a result the channel ranges that the wireless network card needs to scan become broader accordingly. For example, the bands utilized by the IEEE 802.11a distribute at or around 5 GHz, while the bands utilized by the IEEE 802.11b distribute at or around 2.4 GHz; therefore, the corresponding channels are different. In general, a wireless network card cannot perform data transceiving operations while performing channel scan. Hence, when the number of channels is greater, data transceiving of the wireless network card must wait a longer time before the process of scanning channels completes. Only after scanning for channels has completed can the wireless network card continue with data transceiving. In addition, even when the operating system has not yet automatically sent out a channel scanning request to the wireless network card, but the user takes an affirmative action and controls the wireless network card to start performing the function of scanning channels, the wireless network card also stops transceiving data. Hence, the above-mentioned situation causes the data throughputs of the wireless network card being hindered and the performance of the wireless network card consequently suffers.

SUMMARY OF THE INVENTION

One of the objectives of the claimed invention is therefore to provide a highly efficient channel scanning method.

According to an embodiment of the claimed invention, a channel scanning method applied to a wireless communication system for scanning a plurality of channels to select at least a target channel available for use by the wireless communication system is disclosed. The channel scanning method comprises: performing a first channel scanning procedure for scanning each of the channels to detect if any of the channels is capable of establishing a corresponding connection, and setting at least one of the channels capable of establishing said corresponding connections to be the target channel; and performing a second channel scanning procedure for scanning the channel to detect if the channel is capable of establishing a connection.

In addition, another embodiment provides a channel scanning method applied to a wireless communication system for scanning a plurality of channels to select at least a target channel available for use by the wireless communication system. The channel scanning method comprises: dividing the channels into a plurality of channel sets, wherein the channel sets include a first channel set and a second channel set; scanning the first channel set in a first period; and scanning the second channel set in a second period; setting at least one channel capable of establishing a connection to be the target channel; wherein there is a predetermined period between the first period and the second period.

Furthermore, according to another embodiment, a channel scanning method applied to a wireless communication system is disclosed. The channel scanning method comprises: sequentially scanning channels in a first period to determine a plurality of target channels capable of establishing connections; recording the target channels; and sequentially scanning the recorded target channels in a second period to verify that the target channels are capable of establishing connections.

These and other embodiments and objectives will become obvious to those of ordinary skill in the art after reading the following detailed description of the preferred embodiments that are illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
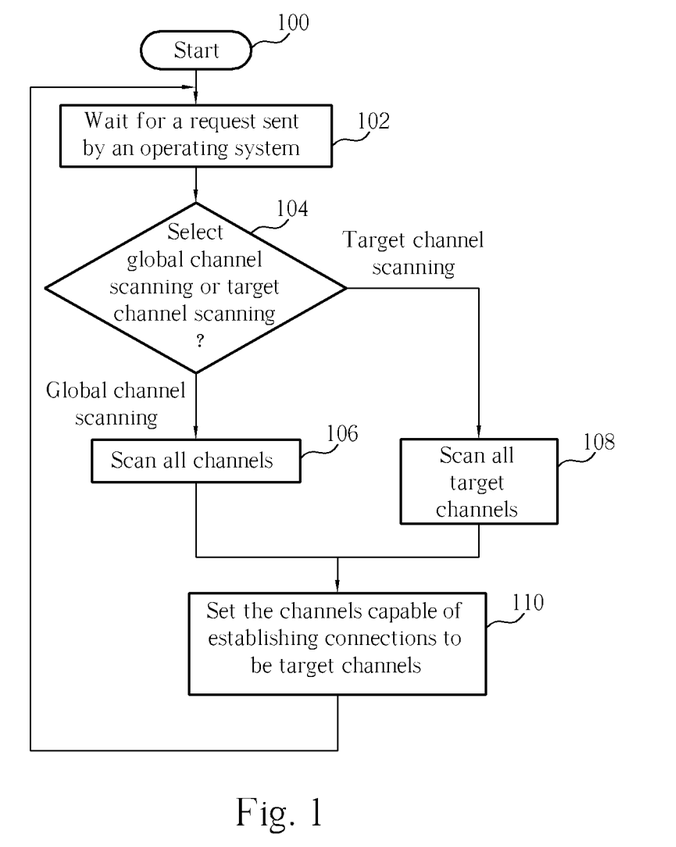
FIG. 1 is a flowchart of a channel scanning method according to an embodiment of the present invention.

Please refer to FIG. 1. FIG. 1 is a flowchart of a channel scanning method according to an embodiment of the present invention. The operation comprises following steps:

Step 100: Start.

Step 102: Wait for a request sent by an operating system.

Step 104: Select global channel scanning or target channel scanning? Proceed to step 106 if the global channel scanning is selected; otherwise, proceed to step 108 if the target channel scanning is selected.

Step 106: Scan all channels for access points and channels capable of establishing connections; proceed to step 110.

Step 108: Scan all target channels for access points and target channels capable of establishing connections.

Step 110: Set the channels capable of establishing connections to be target channels according to the scanning result; proceed to step 102.

A wireless network card in a laptop is given as an example. When the wireless network card for the first time receives a channel scanning request (step 102), the wireless network card performs a global channel scanning (step 104). At this time, the wireless network card sequentially adjusts the frequency range for receiving signals to a specific channel and detects if any access points capable of establishing connections exist in the current frequency range. Afterwards, the wireless network card adjusts the frequency range for the receiving signal to a next channel. In this way, all channels are scanned sequentially (step 106). Finally, information about the channels capable of establishing connections is recorded and these channels capable of establishing connections are set as target channels (step 110). In the present embodiment, upon receiving a future channel scanning request, the wireless network card performs a target channel scanning. The target channel scanning is similar to the global channel scanning. The primary difference is that the target channel scanning only scans certain specific channels instead of all channels. Assume that during the last scanning process, the channels 1, 3, 7, and 11 are detected and determined as capable of establishing connections. When the target channel scanning is performed, the channels 1, 3, 7, and 11 are scanned again while the scanning of the other channels is omitted. If the scanning result indicates that now only the channels 1, 3 and 11 are capable of establishing connections, the target channels are updated to be the channels 1, 3 and 11. In this way, by performing the target channel scanning, the time required for executing the scanning process is significantly reduced. Consequently, the data throughput of the wireless network card is increased. In other words, the embodiment method comprises both the mechanism of performing the target channel scanning and that of performing the global channel scanning. In this way, the goal of the global channel scanning, checking a current state of each and every channel, can be maintained, when the advantage of target channel scanning, reducing the time spent on channel scanning, can further be gained.

It is to be noted in step 104 of FIG. 1 that although the target channel scanning can improve the performance of the wireless network card, but as the surrounding wireless connection environment changes over time, new access points capable of establishing connections may have been added. Therefore, the above-mentioned method requires to repeatedly perform the global channel scanning, either periodically or non-periodically, to add the channels associated with the newly introduced access points into the target channels. For example, in the present embodiment, after the first time the wireless network card performs the global channel scanning, the wireless network card can randomly determine the number of times that the target channel scanning will be performed. In addition, after the operation of the target channel scanning has been performed said number of times, the global channel scanning is performed again to update the target channels. In another embodiment, the wireless network card can determine a fixed number of times for performing the target channel scanning, for example 10 times. After the target channel scanning has been performed 10 times, the global channel scanning is thereafter again performed.

Figure 2:
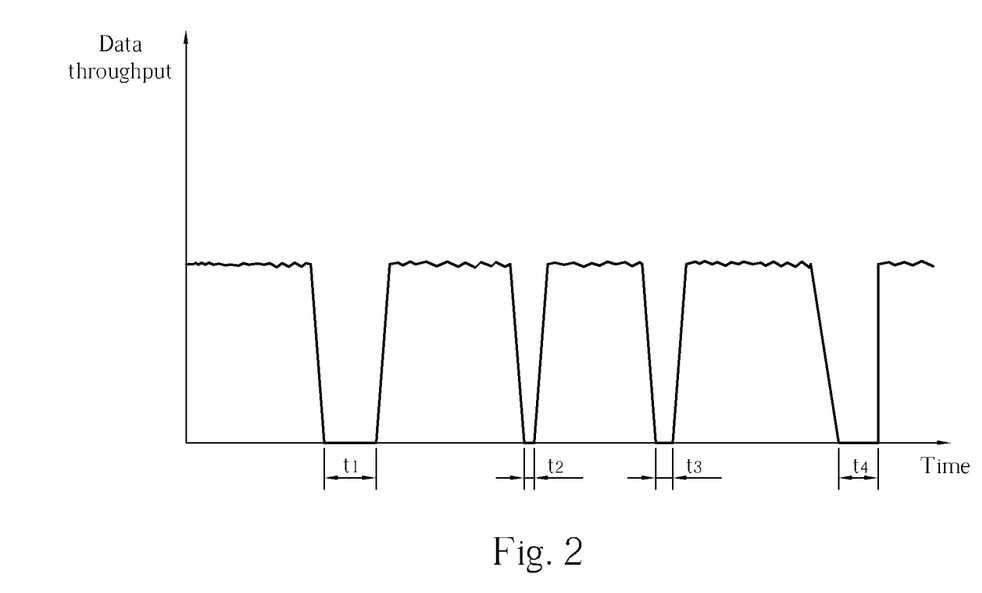
FIG. 2 is a diagram describing data throughputs corresponding to the wireless network card implementing the channel scanning method shown in FIG. 1.

Please refer to FIG. 2. FIG. 2 is a diagram describing data throughput corresponding to the wireless network card when implementing the above-mentioned channel scanning method. When an operating system periodically sends out channel scanning requests, the wireless network card performs the global channel scanning during time intervals $t_1$ and $t_4$ according to the above-mentioned channel scanning method. During such intervals, the wireless network card stops data transceiving, and as a result data throughput is reduced. Because the number of channels being scanned is greater, the time spent on scanning channels is longer. Moreover, the wireless network card performs the target channel scanning during intervals t2 and t3 according to the aforementioned channel scanning method. During these intervals the wireless network card scans only the target channels. Therefore, though the wireless card still has to stop data transceiving, which reduces data throughput, the spent time is less and the data throughput is therefore affected to a much slighter extent.

Figure 3:
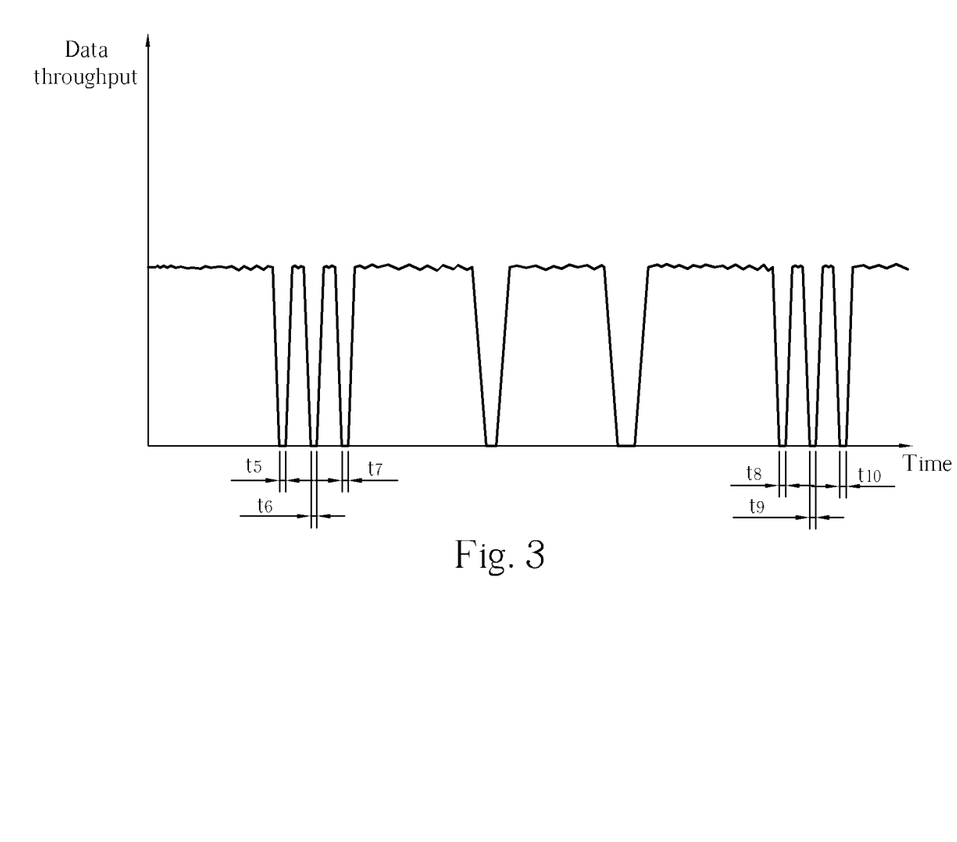
FIG. 3 is a diagram describing data throughputs of the wireless network card implementing a channel grouping mechanism.

As mentioned above, the time spent on each global channel scanning remains unchanged. Such a long interrupt on the data transmission results in a greater chance of data losses and data re-transmissions, and thus the transmission efficiency is still negatively affected. Therefore, the above-mentioned channel scanning method can further adopt a mechanism of channel grouping to improve the performance of the wireless network card. The description of the operation is given in the following. All channels are divided into a plurality of channel sets when performing the global channel scanning; for example, channels 1, 2, 3 and 4 are assigned to a first channel set, channels 5, 6, 7 and 8 are assigned to a second channel set, and channels 9, 10, 11 and 12 are assigned to a third channel set. After each occurrence of scanning a channel set, the wireless network card switches back to normal of data transmission for a predetermined time period. Then, the wireless network card starts scanning a next channel set at the expiration of the predetermined period. Please refer to FIG. 3. FIG. 3 is a diagram describing data throughput of the wireless network card implementing the above-mentioned channel grouping mechanism. As shown in FIG. 3, intervals t5, t6, and t7 respectively correspond to the first, the second, and the third channel sets for performing a first time global channel scanning. Intervals t8, t9, and t10 respectively correspond to the first, the second, and the third channel sets for a second time global channel scanning. In this way, the time originally spent on performing the global channel scanning can be distributed over 3 different intervals of time, so as to reduce the time for each data transmission interrupt. Please note that the same concept can be applied on target channel scanning, which divides the target channels into a plurality of target channel sets for respective scanning operation.

Figure 4:
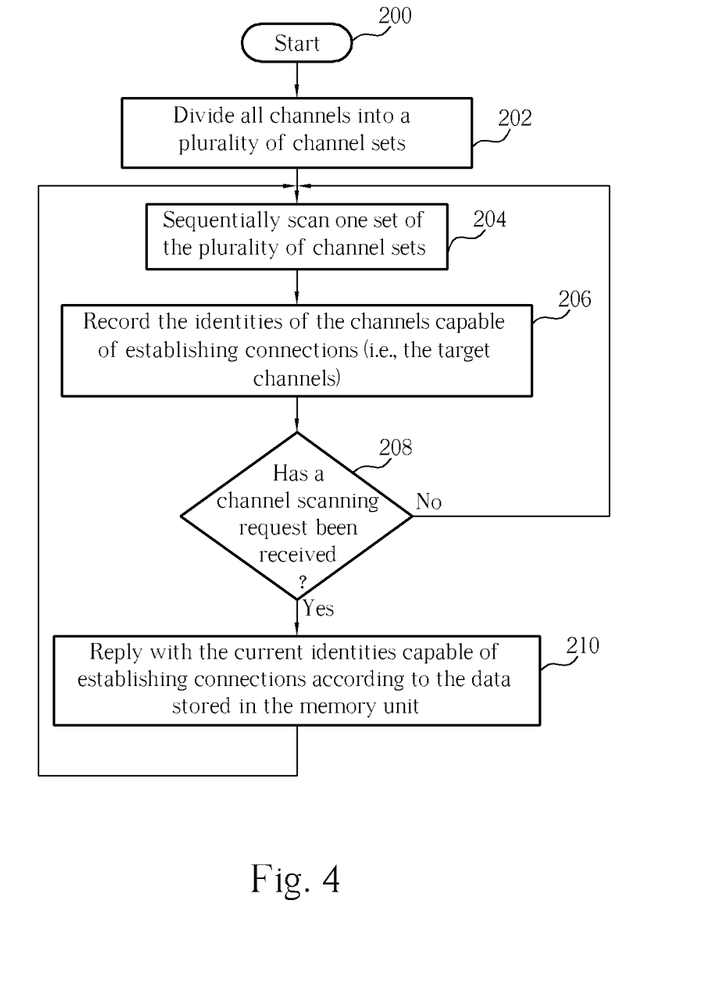
FIG. 4 is a flowchart of a channel scanning method according to another embodiment of the present invention.

Please refer to FIG. 4. FIG. 4 is a flowchart of the channel scanning method according to another embodiment of the present invention. The flowchart comprises the following steps:

Step 200: Start.

Step 202: Divide all channels into a plurality of channel sets.

Step 204: Sequentially scan one set of the plurality of channel sets.

Step 206: Record the identities of the channels capable of establishing connections (i.e., the target channels) obtained in the scanning result of step 204 into a memory unit.

Step 208: Has a channel scanning request been received? If so, proceed to step 210; otherwise, proceed to step 204.

Step 210: Reply with the current channel identities capable of establishing connections according to the data stored in the above-mentioned memory unit.

As shown in FIG. 4, the primary difference between the present embodiment channel scanning method and the previously mentioned channel scanning method is that the present channel scanning method actively and continuously performs the channel scanning instead of performing the channel scanning only upon a channel scanning request has been received. First, all channels are divided into a plurality of channel sets (step 202); for example, channels 1, 2, 3 and 4 are assigned to a first channel set, channels 5, 6, 7 and 8 are assigned to a second channel set, and channels 9, 10, 11 and 12 are assigned to a third channel set. Next, one of the channel sets is selected for scanning (step 204), and the scanning result is recorded in a memory unit (step 206). In the present embodiment, when the wireless network card receives a channel scanning request, such as a channel scanning request periodically sent by an operating system, the wireless network card directly replies to the operating system that has sent out the channel scanning request with the target channel identities currently recorded in the memory unit. On the other hand, if a channel scanning request is not received, the wireless network card proceeds to scan a next channel set.

Figure 5:
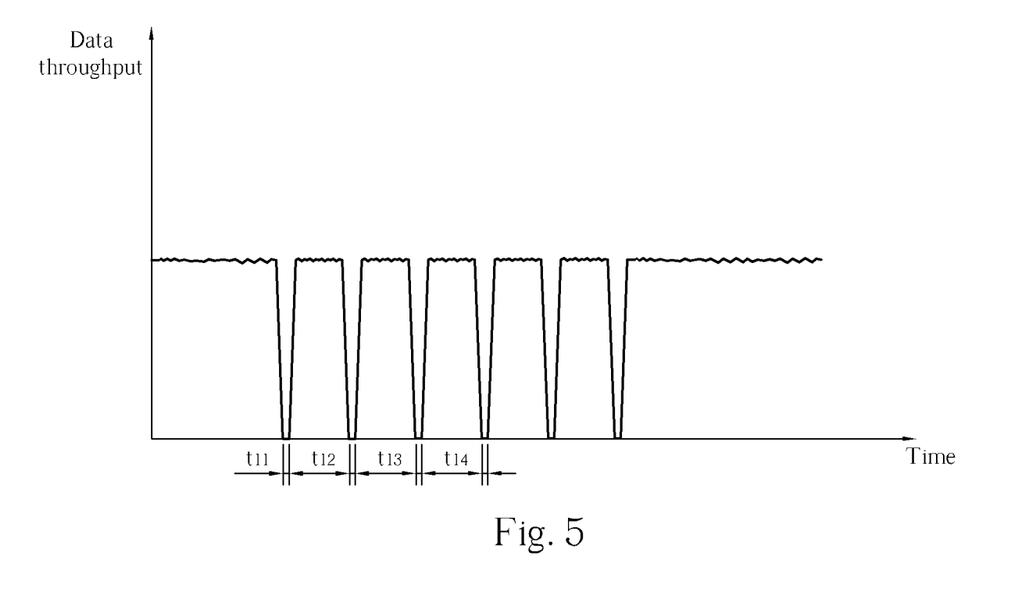
FIG. 5 is a diagram describing data throughputs of the wireless network card implementing the channel scanning method shown in FIG. 4.

Please refer to FIG. 5. FIG. 5 is a diagram describing data throughput of the wireless network card implementing the above-mentioned channel scanning method in FIG. 4. As shown in FIG. 5, the wireless network card scans the first, the second, and the third channel sets during intervals $t_{11}$, $t_{12}$, and $t_{13}$, respectively. The wireless network card then again scans the first channel set again during interval $t_{14}$. In the present embodiment, after each time the wireless network card has finished scanning a channel set, the wireless network card updates the information stored in the memory unit about the identities of the target channels corresponding to the channel set. Hence, the advantage of the present embodiment channel scanning method is that the wireless network card can immediately reply with the channel scanning information responsive to a request and the data transmission is not affected each time the wireless network card receives the channel scanning request.

Figure 6:
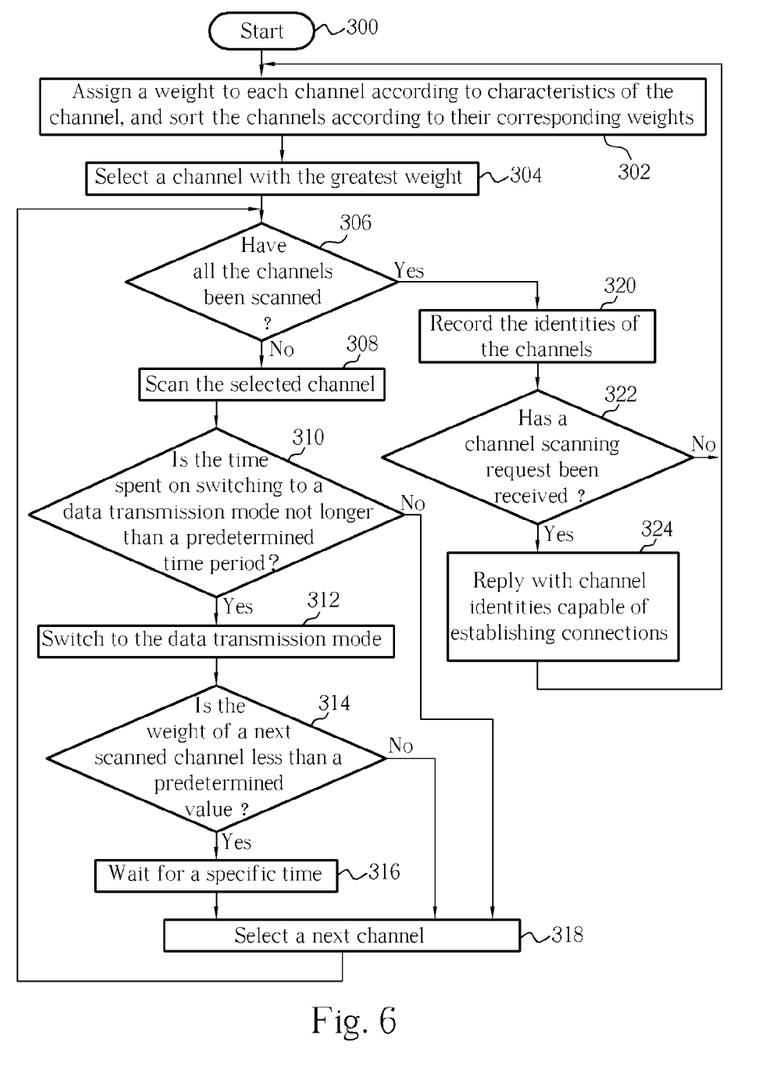
FIG. 6 is a flowchart of the channel scanning method shown in FIG. 4 according to another embodiment of the present invention.

Please refer to FIG. 6. FIG. 6 is a flowchart of the above-mentioned channel scanning method according to another embodiment of the present invention. The flowchart comprises following steps:

Step 300: Start.

Step 302: Assign a weight to each channel according to characteristics of the channel, and sort the channels according to their corresponding weights.

Step 304: Select a channel with the greatest weight.

Step 306: Have all the channels been scanned? If so, proceed to step 320; otherwise, proceed to step 308.

Step 308: Adjust the frequency range of the wireless network card for transceiving signals to the selected channel and detect if the selected channel is capable of establishing a connection.

Step 310: Is the time spent on switching the frequency range of the wireless network card from the selected channel to a channel for transmitting data not longer than a predetermined time period, and are the band utilized by the selected channel and the band utilized by the channel for transmitting data the same frequency band? If the answers to both questions above are yes, proceed to step 312; otherwise, proceed to step 318.

Step 312: The wireless network card is switched to a data transmission mode to proceed with transmitting data.

Step 314: Is the weight of a next scanned channel less than a predetermined value? If so, proceed to step 316; otherwise, proceed to step 318.

Step 316: Wait for a specific time and then proceed to step 318.

Step 318: Select a next channel according to the sorted sequence of the channels.

Step 320: Record the identities of the channels capable of establishing connections (i.e., the target channels) according to the scanning result.

Step 322: Has a channel scanning request been received? If so, proceed to step 324; otherwise, proceed to step 302.

Step 324: Reply with the channel identities capable of establishing connections according to the data stored in the memory unit, and return to step 302.

First, the wireless network card assigns a weight to each channel according to characteristics of the channel, and sorts the channels according to the corresponding weights, so as to sequentially scan the channels (step 302). The detailed description of generating weights is described in the following. Next, select and scan a channel with the greatest weight (step 304 through step 308). After completing the execution of the channel scanning process, the wireless network card determines if the time spent on switching the frequency range of the wireless network card from the currently selected channel to a channel previously utilized for transmitting data is not longer than a predetermined time. At the same time, it is also determined if the frequency band utilized by the selected channel and the frequency band utilized by the channel for transmitting data are the same (step 310). If the answers to the above-mentioned two questions are both yes, the wireless network card is switched to a data transmission mode to proceed with transmitting data (step 312). Otherwise, the wireless network card directly selects a next channel (step 318), and returns to step 306. After step 312, the wireless network card checks the weight of the next channel (step 314). If the weight is less than a predetermined value (e.g., 0X80), the wireless network card selects a next channel after waiting for a specific period (e.g., 100 ms) (steps 316 and 318). If the weight is not less than the predetermined value, the wireless network card directly selects a next channel (step 318). Please note that at this time, the wireless network card still continues transmitting data. After step 318, the wireless network card determines if all channels have been scanned (step 306). If the execution of the channel scanning process has not completed, the wireless network card switches back to the channel scanning mode (step 308); otherwise, the wireless network card records the identities of all the channels capable of establishing connections in a memory unit (step 320), and determines if a channel scanning request has been received. If the channel scanning request has been received, the wireless network card replies to the operating system with the channel identities capable of establishing connections; otherwise, the method returns to step 302.

In addition, the present embodiment assigns a weight to each of the channels according to the characteristics of the channel, wherein the channels with the same weights are assign to the same channel set. Therefore, the time points at which the channels in the same channel set are scanned are close to one another. Moreover, the channels can be processed after scanned in different ways according to the characteristics of the channel sets.

Figure 7:
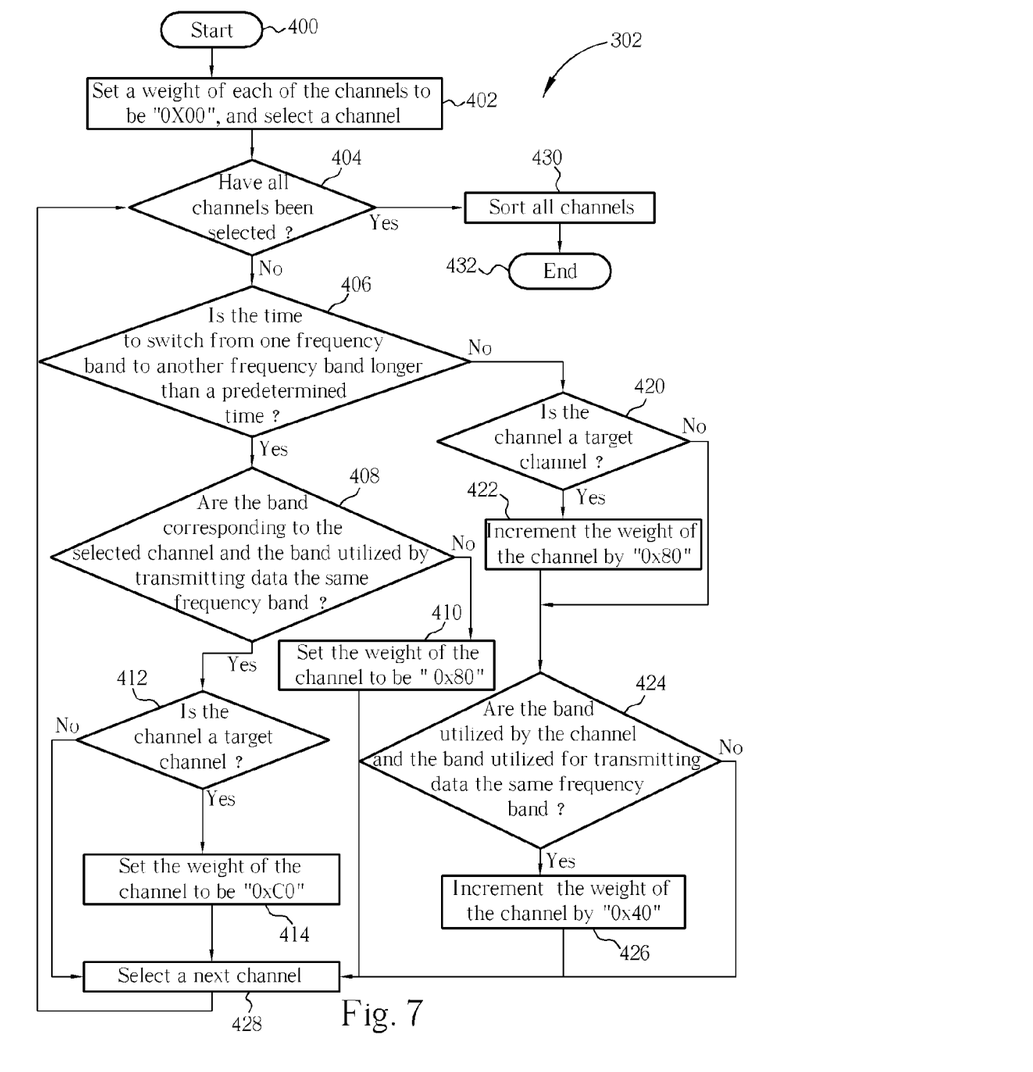
FIG. 7 is a detailed flowchart of step 302 shown in FIG. 6.

Please refer to FIG. 7. FIG. 7 is a detailed flowchart of step 302 shown in FIG. 6. The detailed flowchart shown in FIG. 7 comprises following steps:

Step 400: Start.

Step 402: Set a weight of each of the channels to be "0X00", and select a channel.

Step 404: Have all channels been selected? If so, proceed to step 430; otherwise, proceed to step 406.

Step 406: Is the time to switch from one frequency band to another frequency band (for example, from the band of 2.4 GHz to the band of 5 GHz, or vice versa) longer than a predetermined time? If so, proceed to step 408; otherwise, proceed to step 420.

Step 408: Are the band corresponding to the selected channel and the band utilized by transmitting data the same frequency band? If so, proceed to step 412; otherwise, proceed to step 410.

Step 410: Set the weight of the channel to be "0x80", and proceed to step 428.

Step 412: Is the channel a target channel? If so, proceed to step 414; otherwise, proceed to step 428.

Step 414: Set the weight of the channel to be "0xC0"; proceed to step 428.

Step 420: Is the channel a target channel? If so, proceed to step 422; otherwise, proceed to step 424.

Step 422: Increment the weight of the channel by "0x80".

Step 424: Are the band utilized by the channel and the band utilized for transmitting data the same frequency band? If so, proceed to step 426; otherwise, proceed to step 428.

Step 426: Increment the weight of the channel by "0x40".

Step 428: Select a next channel and repeat step 404.

Step 430: Sort all channels according to the weights of the channels.

Step 432: End.

As shown in FIG. 7, step 302 further implements steps 406, 408, 412, 420, and 424 to observe characteristics of each channel, and assign a weight to the channel according to the characteristics of the channel in steps 410, 414, 422 and 426. The weights are originally set to be "0X00", and then the weights are set to be one of "0X00", "0X40", "0X80" or "0XC0". Therefore, the channels can be divided into four channel sets. Finally the present method further sorts the channels according to the weights of the channels. After the sorting process is completed, the present embodiment proceeds with step 304 shown in FIG. 6. In the present embodiment, the channel scanning mode and the data transmission mode are alternately performed. Therefore, when the wireless network card is incorrectly and repetitively triggered by several channel scanning requests, the wireless network card can reply to the operating system with the information about the channel scanning according to the data stored in the memory unit. In this way, the user will not easily discover that data transmission is interrupted due to the channel scanning process. In addition, in the present embodiment, the present invention wireless network card switches back to the data transmission mode only when the time spent on switching between bands is not longer than the predetermined time. Hence, the time spent on switching between bands can be reduced and the data throughput of the wireless network card can be increased.

According to the embodiments of the present invention, the channel scanning method can reduce the time spent on the channel scanning process with the accuracy not affected. The channel scanning method also distributes all the required time spent on the channel scanning process over several time intervals to improve the performance of the wireless network card. The above-mentioned channel scanning method can be applied to the wireless communication system adopting several communication protocols (i.e., IEEE 802.11a, IEEE 802.11b and IEEE 802.11g) to efficiently complete the channel scanning process. Therefore, the present invention allows the wireless network card to increase the data throughput and exhibit improved performance. Finally, although throughout the entirety of this document wireless network card is used as an exemplary embodiment, a skilled artisan would appreciate that the present invention can also be applied to embedded wireless networking system (for example, a laptop-type computer integrated with wireless networking module), or any other wireless networking system performing channel scan.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel scanning method applied to a wireless communication system comprising: (a) performing, by a network device, in a first time period a first channel scanning procedure for scanning each of a plurality of channels to determine which of the channels is capable of establishing a corresponding connection, and setting each of the channels capable of establishing corresponding connections to be a target channel, thereby creating a subset of target channels, wherein the first channel scanning procedure is associated with a first data transceiving stoppage time; and (b) performing, by the network device, in a later time period a second channel scanning procedure for scanning only the subset of target channels to determine which of the target channels is capable of establishing a connection and updating the subset of target channels by omitting from the target channels any channel not determined to be capable of establishing a connection, wherein the second channel scanning procedure is associated with a second data transceiving stoppage time that is less than the first data transceiving stoppage time; wherein step (a) and step (b) are repeated, wherein a number of repetitions of step (b) is greater than a number of repetitions of step (a), and wherein the number of repetitions of step (a) is a function of the number of repetitions of step (b); wherein sequentially scanning channels of a first channel set of the channels occurs in a first sub-period of the first period; and sequentially scanning channels of a second channel set of the channels occurs in a second sub-period of the first period.

2. The channel scanning method of claim 1, further comprising: randomly determining when to perform the first channel scanning procedure or the second channel scanning procedure when the wireless communication system inquires if there is a channel for establishing a connection.

3. The channel scanning method of claim 1, wherein the step of performing a second channel scanning procedure comprises: determining if a particular target channel will be updated according to a scanning result after scanning the channel.

4. The channel scanning method of claim 1, wherein the step of scanning each of the channels comprises:
dividing the channels into at least a first channel set and a second channel set;
scanning the first channel set in a first period; and scanning the second channel set in a second period;
wherein a predetermined period exists between the first period and the second period.

5. The channel scanning method of claim 1, wherein when the first channel scanning procedure sets the channels capable of establishing connections to be the target channels, the step of performing the second channel scanning procedure for scanning the channel comprises:
dividing the target channels into at least a first target channel set and a second target channel set;
scanning the first target channel set in a first period; and
scanning the second target channel set in a second period; wherein a predetermined period exists between the first period and the second period.

6. A channel scanning method applied to a wireless communication system for scanning a plurality of channels comprising: dividing, by a network device, the channels into a plurality of channel sets, wherein the channel sets include a first channel set and a second channel set; scanning, by the network device, the channels in the first channel set in a first time period and recording identities of a first subset of channels capable of establishing a connection; upon scanning the first channel set, entering data transmission mode for a predetermined period of time; based on whether a channel request is received, scanning, by the network device, the channels in the second channel set in a second time period and recording identities of a second subset of channels capable of establishing a connection, wherein the second time period is spaced apart from the first time period by the predetermined period of time; wherein scanning the first channel set in the first time period and second channel set in the second time period results in a shorter data transceiving stoppage time than scanning all of the channels in a single time period; and setting each of the channels capable of establishing corresponding connections to be a target channel, thereby creating subsets of target channels; performing, by the network device, in a later time period channel scanning procedures for scanning only the subsets of target channels to determine which of the target channels is capable of establishing a connection and updating the subsets of target channels by omitting from the target channels any channel not determined to be capable of establishing a connection; wherein sequentially scanning channels of a first channel set of the channels occurs in a first sub-period of the first period; and sequentially scanning channels of a second channel set of the channels occurs in a second sub-period of the first period.

7. The channel scanning method of claim 6, being performed when the wireless communication system periodically triggers a channel scanning request.

8. A channel scanning method applied to a wireless communication system, comprising: sequentially scanning, by a network device, channels in a first period to determine a plurality of target channels capable of establishing connections, wherein scanning the channels is associated with a first data transceiving stoppage time; recording, by the network device, the target channels; sequentially scanning, by the network device, only the subset of the recorded target channels in a second period to verify that the target channels are capable of establishing connections, wherein scanning the recorded target channels is associated with a second data transceiving stoppage time that is less than the first data transceiving stoppage time; updating, by the network device, the recording of the subset of the target channels to omit the target channels recorded after the first period scanning determined in the second period scanning not to be capable of establishing connections; and replying, by the network device, to a channel scanning request with identities of the recorded target channels; wherein sequentially scanning channels of a first channel set of the channels occurs in a first sub-period of the first period; and sequentially scanning channels of a second channel set of the channels occurs in a second sub-period of the first period.

9. The channel scanning method of claim 8, further comprising:
sequentially scanning channels of a third channel set of the recorded target channels in a third sub-period of the second period; and
sequentially scanning channels of a fourth channel set of the recorded target channels in a fourth sub-period of the second period.

10. The channel scanning method of claim 8, further comprising:
sequentially scanning the channels in a third period to determine target channels capable of establishing connections; and
updating the recorded target channels according to the channel scanning in the third period.

11. The channel scanning method of claim 8, wherein the wireless communication system is a wireless LAN.

12. A channel scanning method applied to a wireless communication system, comprising:
(a) assigning, by a network device, a weight to each of a plurality of target channels capable of establishing connections;
(b) selecting, by the network device, a target channel having the largest assigned weight;
(c) scanning, by the network device, the selected target channel;
(d) determining, by the network device, whether an amount of time spent on switching the frequency range of a wireless network card from a currently selected target channel to a channel previously utilized for transmitting data is not longer than a predetermined time;
(e)(i) if the determining operation of (d) determines that the time spent on switching would be longer, the next weighted channel, of the plurality of target channels, is selected and operations proceed at step (c);
(e)(ii) if the determining operation of (d) determines that the time spent on switching would not be longer, then the wireless network card is switched to a data transmission mode and the system proceeds with data transmission;
(f) determining if a next channel in the plurality of target channel has a weight less than the predetermined value; and
(g)(i) if the determining operation of (f) determines that the next channel has a weight less than the predetermined value, the wireless network card selects the next channel after waiting for a specific period,
(g)(ii) if the determining operation of (f) determines that the next channel does not have a weight less than the predetermined value, then the wireless network card directly selects the next channel.

13. The channel scanning method of claim 12, wherein the operation of assigning a weight to each of a plurality of target channels is performed according to characteristics of the plurality of channels.

14. The channel scanning method of claim 12, wherein assigning the weight to each of the plurality of target channels capable of establishing connections comprises assigning one of a plurality of predetermined weight values.

15. The channel scanning method of claim 6, further comprising upon scanning the second channel set, returning to data transmission mode for the predetermined period of time.

* * * * *